US005114283A

United States Patent [19]

Fulton

[11] Patent Number: 5,114,283

[45] Date of Patent: May 19, 1992

[54] SPRING BARREL BUSHER ATTACHMENT

[76] Inventor: James H. Fulton, 4000 Flynn St. #58, Bellingham, Wash. 98226

[21] Appl. No.: 541,945

[22] Filed: Jun. 22, 1990

[51] Int. Cl.[5] .............................................. B23B 41/00

[52] U.S. Cl. .................................... 408/103; 269/111; 408/109

[58] Field of Search ........... 408/103, 108, 109, 115 R; 269/97, 98, 99, 100, 101, 111, 113, 189

[56] References Cited

U.S. PATENT DOCUMENTS 1,033,758 7/1912 Howell ................................. 269/99

4,060,333 11/1977 White ................................. 408/103

*Primary Examiner*—Daniel W. Howell

[57] ABSTRACT

The invention relates to an attachment piece designed to fit onto conventional bushing tools in order to securely hold a worn spring barrel of a clock for a bushing operation. The attachment piece comprises a plate, a pair of clamps, and a pair of cross pieces that are secured onto the spring barrel through the use of the clamps. The plate is a flat surface that is capable of being secured to the conventional clamps now in use on state-of-the-art clock bushing tools.

2 Claims, 2 Drawing Sheets

SPRING BARREL BUSHER ATTACHMENT

BACKGROUND OF THE INVENTION

1. Field of the Invention

The invention relates to the field of clockwork and in particular to those tools of the trade that are used to install new bushings in clocks. The invention that is the subject of the present application is an attachment piece that may be fit onto existing bushing tools to enable one to bush out a clock spring barrel.

2. Description of the Prior Art

Existing publications in the field suggest that clock spring barrels that are worn should be bushed by hand. It is recognized that there is no readily available retaining means to secure a spring barrel for a bushing operation on conventional bushing apparatus. One article suggests that the clock repairer hold the spring barrel steady by hand while a Bergeon Bushing tool is used to ream open the hole. This method is time consuming, probably painful and dangerous to the repairer and may cause inaccurate reamings.

The Bergeron Bushing tool uses a set of clamps that clamp on over the plate of the clock so that the pivot holes can be repaired. This tool, as well as the K-D bushing tool, cannot really be used for the spring barrel as the clamps are not in the right place or of the right size to accommodate a spring barrel.

The only way to use a Bergeon bushing tool on a spring barrel is to first hold the barrel by hand and then ream out the unevenness in the hole in the spring barrel. This step of rounding out the hole requires a fair degree of skill, since it is done by hand. After this, the spring barrel is again placed on a bushing tool, such as a Bergeon or a K-D bushing tool and then, while still holding the spring barrel by hand, press a new bushing into the hole. Once the new bushing is in place, it must be fitted to the barrel arbor. This requires opening the bushing hole with a cutting broach and again holding it by hand, since there are no currently available attachments to secure spring barrels onto busing tools. Trade journal articles suggest that a custom-made stake be used so that the barrel can fit onto the Bergeon tool. This stake would also have to be hand made.

SUMMARY OF THE INVENTION

The attachment piece of the present invention is used to hold a clock spring barrel so that the worn hole can be reamed out and a new bushing installed. The tool is designed to be fit onto conventional bushing tools through the use of a plate that is a part of the bushing attachment. The plate uses four clamps, and a pair or cross pieces that are secured across the spring barrel through the use of the clamps. When it is desired to bush a worn spring barrel, the barrel is placed within the clamps and the plate is attached to the clamps of the conventional bushing tool. The barrel is reamed and out and a new bushing is installed using the conventional bushing tools.

It is the object of this invention to provide an attachment piece for conventional clock bushing tools that is capable of securing a clock spring barrel for bushing operations.

Another objective of the invention is to provide a piece capable of securing a clock spring barrel for reaming and pressing in new bushings using a conventional bushing tool.

Yet another objective of the invention is to provide an attachment piece to conventional bushing tools that can be adapted to fit a wide variety of clock parts that would other wise not fit into conventional bushing tool configurations.

Other advantages of the invention should be readily apparent to those skilled in the art once the invention has been described.

DESCRIPTION OF THE PREFERRED EMBODIMENT

Figure 1:
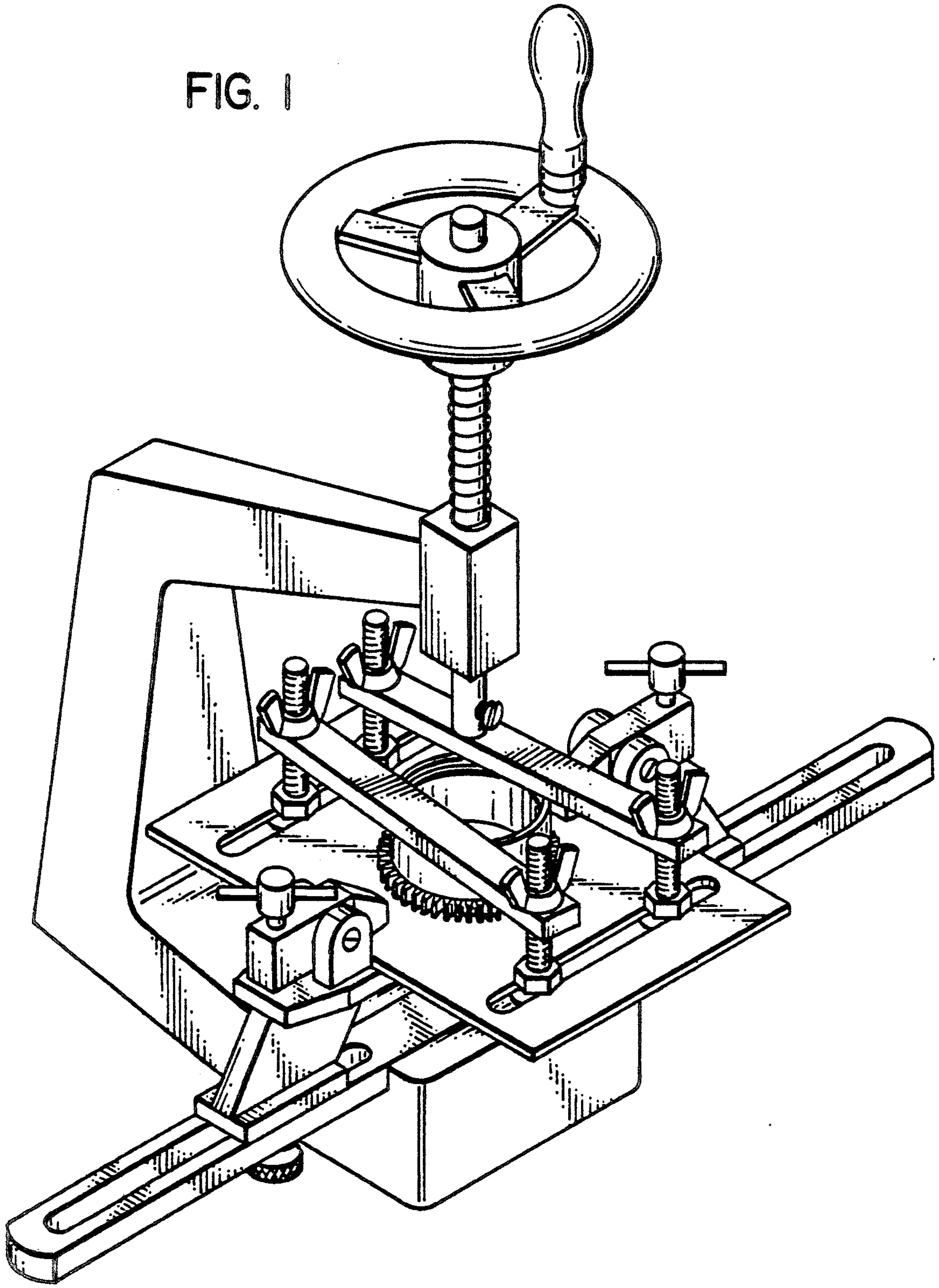
FIG. 1 shows a state of the art Bergeon Bushing tool with the attachment piece in place holding a spring barrel.
Figure 2:
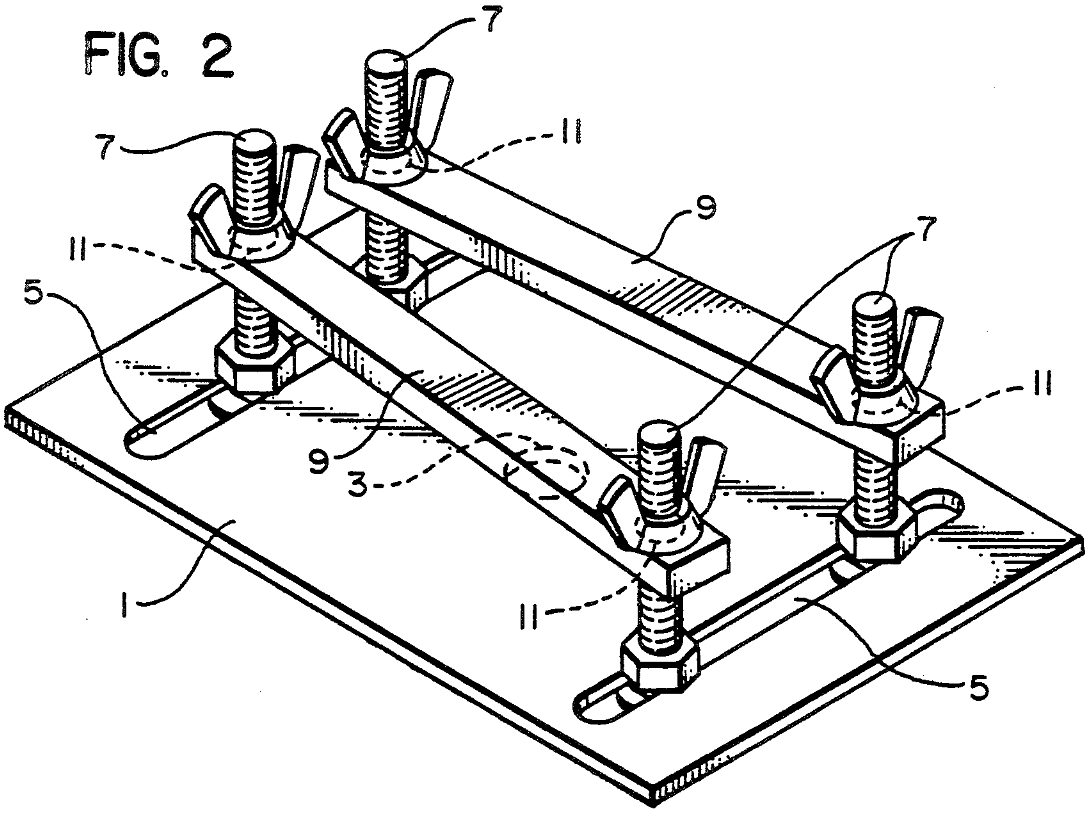
FIG. 2 shows the busher attachment piece.

The invention is an attachment piece (see FIG. 2) for conventional clock bushing tools (FIG. 1) so that the spring barrels of clocks may be reamed out so that a new bushing can be put in. Renewing the bearing surfaces of the barrel is very important in clock repair because a great deal of power can be lost due to a faulty arbor alignment.

The invention comprises a holding plate and a series of four clamps set around the edge of the plate that lock the spring barrel into place so that the worn out spring barrel hole can be reamed out and a new bushing can be installed.

The bushing attachment piece (see FIG. 2) comprises a flat piece 1, having a hole 3, in the center capable of allowing reaming tools to fit through when the reaming operation on the spring barrel is completed. The flat piece also has a pair of lateral slots 5, extending near the edges of the flat piece and opposed to one another. The slots allow the clamps to be adjusted in relation to one another and the spring barrel itself so that different size barrels may be fit on the attachment piece. A pair of clamps 7 is used in connection with the slots. They fit into the slots and are used to secure the cross pieces 9 that are in actual contact with the spring barrel. Two cross pieces are used in connection with the clamps. They are long and narrow pieces with holes 11 drilled at each end so that they may be accommodated into the screws of the clamps.

To use the bushing attachment to bush a spring barrel the user fits the worn spring barrel underneath the cross pieces and secures the spring barrel to the flat piece by tightening the clamps that are in connection with the cross pieces.

Care should be taken to insure that the large hole in the center of the flat piece is directly underneath the center hole of the spring barrel since eventually the reamer on the bushing tool will come through the center hole of the spring barrel and could damage the flat piece if the hole is not positioned correctly.

Once the spring barrel is secured to the flat piece by the attachment piece clamps 7, the combination of the bushing attachment piece with attached spring barrel is then connected to the clamps on the conventional bushing tool. Any of the conventional bushing tools may be used. Indeed that is the reason for the choice of the flat piece since it may be adapted into various sizes and shapes of clamps that come with bushing tools. For example: the Bergeon bushing tool, the K&D Bushing tool, etc. all have a set of clamps that the flat piece can be connected to.

With the attachment and spring barrel in place on the bushing machine the worn spring barrel is now ready for the reaming operation. This operation is done by the reamer on the conventional bushing tool. This eliminates the use of a large stake that has been suggested by trade journals and would otherwise be necessary for aligning the spring barrel. Such a stake would probably have to be made by hand.

After the barrel has been reamed out a new bushing is pressed into the hole. The attachment, with spring barrel still fixed to it, is removed from the bushing tool and placed in a conventional vise. When the plate and barrel are in place the new bushing is opened with a cutting broach until the arbor can be fit into the barrel. When the barrel is removed, it is now ready to be installed back in the clock.

A similar procedure can be used for bushing the cap piece that is fit on top of the spring barrel.

Conventional material sturdy enough for work of this nature should be used in the construction of the bushing tool. Metals are preferred, probably they would be of steel, brass or iron.

I claim:

1. An attachment piece for conventional clock bushing tools for reaming out worn clock spring barrels said attachment piece comprising: a flat plate capable of being secured into the clamps of said conventional clock bushing tool, said plate having two ends and a central aperture capable of allowing the drill of the conventional bushing tool to pass through, said plate having two slots near the two ends of said plate, said slots being on opposite sides of the plate from each other, each slot in connection with two vertical pieces, each of said vertical pieces having an attaching means, each attaching means being in connection to a cross piece, said cross pieces having a hole at each end so that said cross pieces may be attached to said vertical pieces so that said cross pieces are approximately parallel to each other and capable of accommodating said spring barrel in the space between said cross pieces and said flat piece.

2. The apparatus of claim 1 wherein said vertical pieces comprise a threaded length having a top and bottom end, a nut attached to said bottom end of said length, said nut capable of preventing said screw clamp from moving upward through said slot, a wing nut at said top end of said threaded length, said wing nut capable of securing said cross pieces from coming off said threaded length.

* * * * *